June 11, 1968     W. J. VANDERSTEEG     3,387,517

TOOLHEAD

Original Filed Dec. 3, 1965     3 Sheets-Sheet 1

INVENTOR.
WILLIAM J. VANDERSTEEG
BY
*Barlow & Barlow*
ATTORNEYS

June 11, 1968 W. J. VANDERSTEEG 3,387,517

TOOLHEAD

Original Filed Dec. 3, 1965 3 Sheets-Sheet 2

INVENTOR.
WILLIAM J. VANDERSTEEG
BY

*Barlow & Barlow*
ATTORNEYS

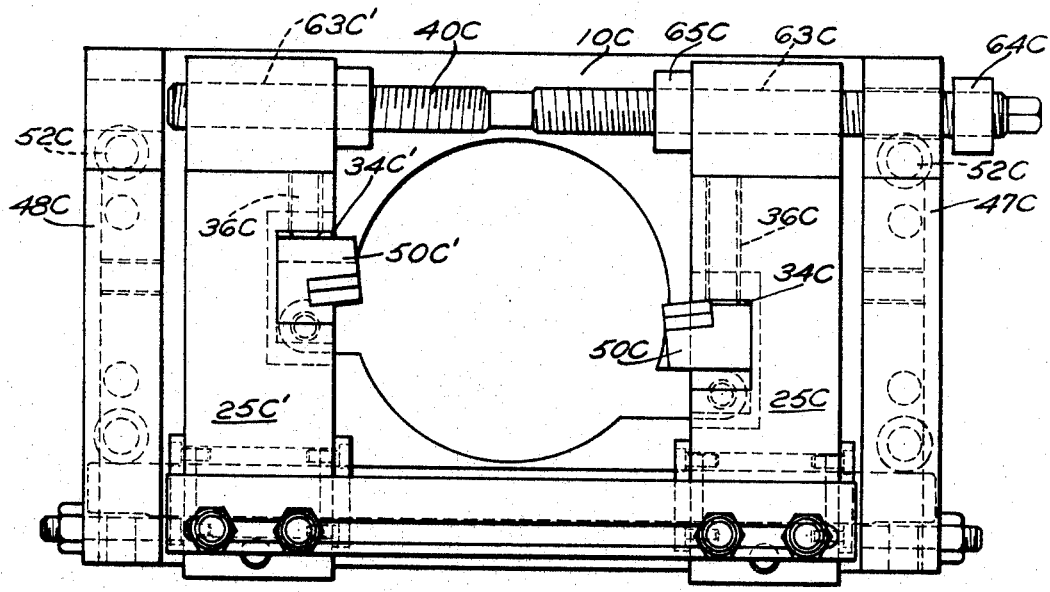
FIG. 8
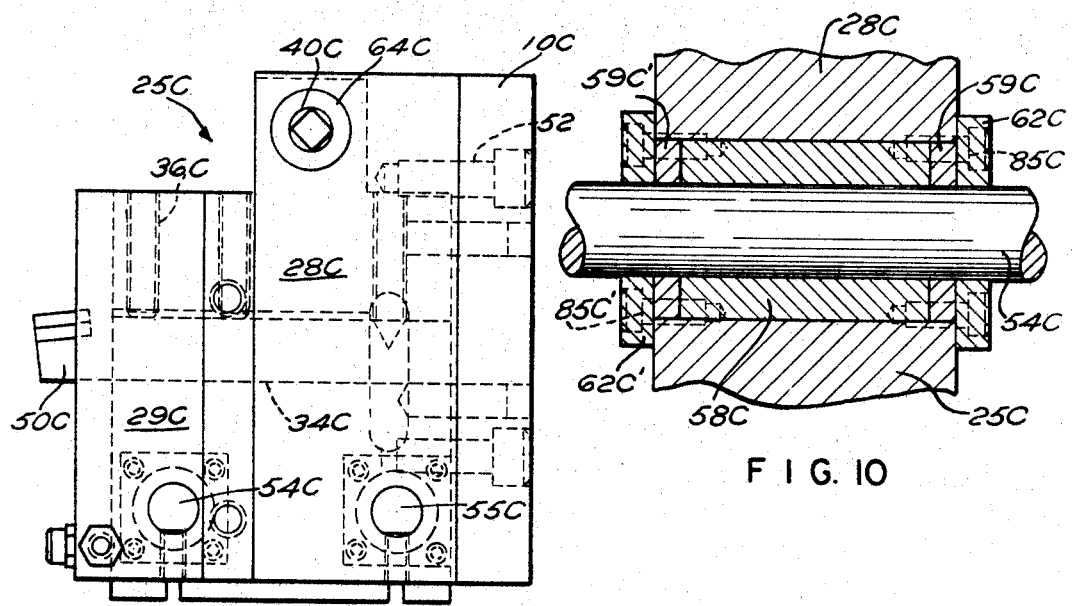
FIG. 9
FIG. 10
INVENTOR.
WILLIAM J. VANDERSTEEG
BY
*Barlow & Barlow*
ATTORNEYS

United States Patent Office 3,387,517
Patented June 11, 1968

3,387,517
TOOLHEAD
William J. Vandersteeg, Lansing, Ill., assignor to Madison Industries, Inc., a corporation of Rhode Island
Continuation of application Ser. No. 517,499, Dec. 3, 1965, which is a continuation-in-part of application Ser. No. 377,336, June 23, 1964. This application Dec. 7, 1966, Ser. No. 599,982
9 Claims. (Cl. 82—25)

This invention relates to a toolhead for turning to accurate size metal bars or other elongated work pieces, which tool is preferably held in a non-rotary position, the work material being rotated relative thereto with relative feeding between the tool and work material, and this is a continuation of my application Ser. No. 517,499 filed Dec. 3, 1965, and now abandoned which is a continuation-in-part of my application Ser. No. 377,336 filed June 23, 1964, and now abandoned.

If a metal bar or the like is turned near the desired size, it has been quite common to change the tool from the rough cutting turning tool to a fine finishing tool to bring the material down nearer to the desired size, after which certain operations such as roller burnishing may be had to provide an accurate and smooth surface finish at the desired size. Whenever tools are changed on a lathe or the like, or if perchance a turret lathe is used and the tools are mounted in the turret and indexed into position, certain errors can creep into the accuracy with which the work is being turned. For example, the alignment of the work relative to the lathe ways could be in error, there could be an index error of the turret and more generally found is an error that is caused by tool deflection and/or work deflection as the part is being turned. Additionally, in some cases the accuracy of the cross slide parts of a lathe, for instance caused by looseness or the like and wear in the spindle bearings of the lathe, might introduce additional errors and provide rather than a round bar an oblong bar. It is obvious that when a bar is turned, it is desired that the bar be round and this is particularly true if the bar is to be roller burnished as the last finishing operation since an equal flow of metal material should occur throughout the periphery of the bar in order to maintain accuracy.

In order to eliminate the above enumerated difficulties an embodiment of the invention utilizes a pair of turning tools which are opposed to each other and which are mounted in a holder that permits the tool to float relative to the fixed means upon which they are supported. It will be appreciated that if the cutting members are fixed in a holder a finite distance apart and the holder is in turn floatingly mounted with respect to a support, then an external reaming tool is in effect provided which has a similar action to internal reaming tools which are mounted in cutter bars and which float in the cutter bars, such reaming tools being exemplified by patents such as the Madison Patent No. 1,118,141 and dated Nov. 24, 1914.

The above general objects and further objects, features and advantages in the present invention will become more clearly apparent from the following detailed description thereof and particularly pointed out in the appended claims.

In the drawings:

FIG. 8 is an elevation of a modification;

FIG. 9 is an end view of FIG. 5; and

FIG. 10 is a fragmental sectional view of the bearing on the guide rod.

Figure 1:
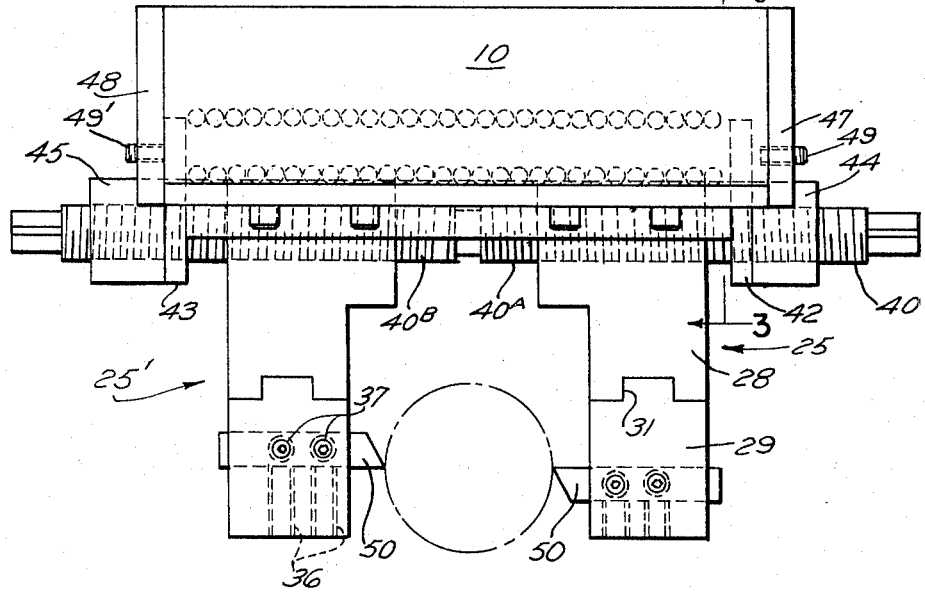
FIG. 1 is an elevational view.
Figures 2, 3:
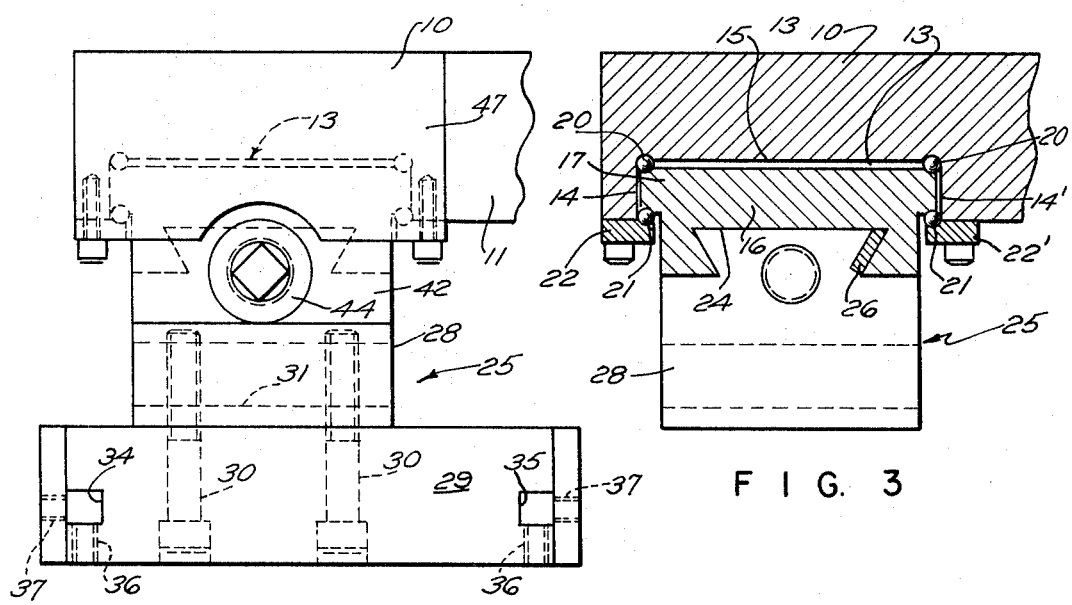
FIG. 2 is an end elevational view taken from the right hand side of FIG. 1.
FIG. 3 is a sectional view taken on lines 3—3 of FIG. 1 with certain parts broken away.

In proceeding with the invention, I provide a tool holder base generally designated 10 which may have an extension thereon such as at 11 (see FIG. 2) for attachment to various mounting devices associated with a lathe such as the turret head of a turret lathe, cross slides and the like. The base 10 is provided with a transverse recess 13 which is basically a rectangular recess having side walls 14, 14′ and a top wall 15. Received within the recess 13 is a sliding T-bar or member 16. This T-bar is made up of a head portion 17 which at the outer ends thereof receives on the top surface thereof a plurality of balls such as 20. Additionally, in the opposite under sides of the T-head another arrangement of balls 21 is found, these latter balls being held in position by retainer plates 22, 22′ which overlap the entry to the recess 13 by a slight amount. The underside of the leg of the T-bar 16 is provided with a dovetail recess 24 and within the dovetail recess a tool holder generally designated 25 is received with a gib of plate 26. The tool holder 25 in the present instance, is shown as comprising a two part member namely an upper part 28 which is directly received within the dovetail slot 24 and a lower part 29 which is bolted to the part 28 as by a plurality of bolts 30. To maintain alignment of the two parts a key slot such as 31 is provided (see FIG. 1) and the lower block 29 is specifically provided with a recess 34 and alternately a second recess 35 to receive the actual cutting tool 50, the cutting tool being secured in position by at least a pair of locking screws located normal to each other such as locking screws 36 and 37 (see FIG. 1).

As has been mentioned above, two mounting blocks 25, 25′ of identical construction are provided and these two blocks are separable each being received in spaced relationship in the slot 24. Passing between the two blocks 25, 25′ is a common adjusting screw designated 40. This screw is received for bearing support in end plates 42 and 43 which close off either end of the slide recess 13. It will be noticed that the adjusting screw is provided first with right-hand threads as at 40A and left-hand threads as at 40B; as will be readily apparent by this arrangement, common rotation of the adjusting screw will move the tool blocks either outwardly or inwardly as the case might be.

It will be apparent from the description as far as it has progressed that we have a reciprocating bar 16 together with tool holders 25 which may be adjusted relative to each other and together move relative to the holder base 10. To provide a stop means to limit the amount of movement of this assembly, plates 47, 48 are mounted at each end of the base 10 over the general recess area 13. Limit screws 49, 49′ pass through these plates so as to be in a position to abut the plates 42, 43, respectively, and thus adjust the amount of movement which may be had by the entire cutter assemblage relative to the tool holder base 10. Since it is difficult to accurately thread the two blocks 25, 25′ onto the screw 40 from each end, there are provided collars 44, 45 which are threadingly received on the screw 40. These collars abut end plates 42, 43 and serve to initially centralize the tool holders or blocks 25, 25′ with relation to the member 16.

Figure 4:
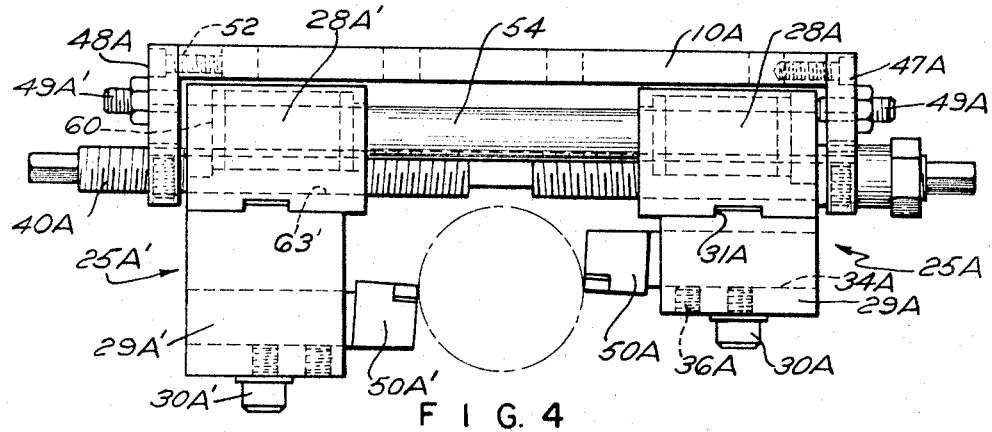
FIG. 4 is an elevational view of a modified form.
Figure 5:
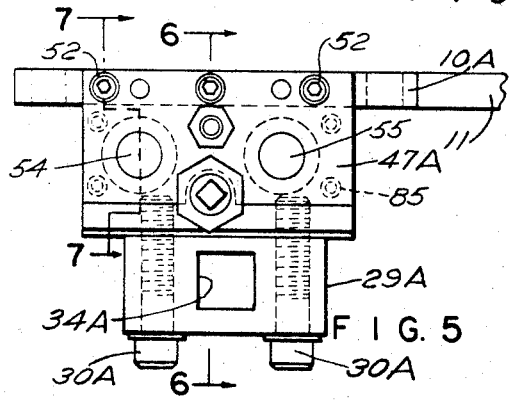
FIG. 5 is an end elevational view taken from the right hand side of FIG. 4.
Figure 6:
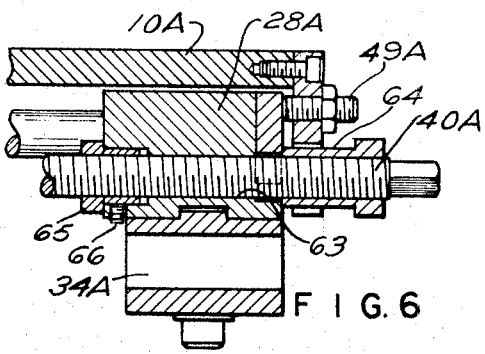
FIG. 6 is a sectional view taken on lines 6—6 of FIG. 4 with certain parts broken away.
Figure 7:
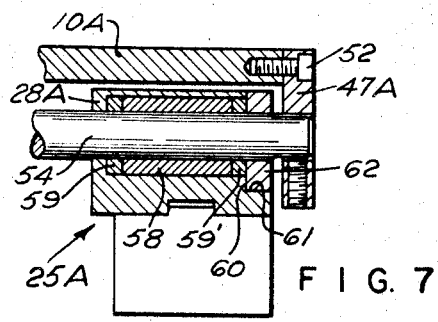
FIG. 7 is a sectional view of the bearing on the guide rod.

Referring now to FIG. 4, a modified form of the invention is illustrated, like parts bearing the suffix letter A, wherein the base 10A has projecting from one side thereof end plate supports 47A and 48A. The end plates are rigidly attached to the base 10A by cap screws such as 52. Extending between the two end plates 47A and 48A are mounting means for a pair of tools. This mounting means takes the form of a pair of circular rods 54 and 55. Slidably received on the rods 54 and 55 are a pair of tool holders generally designated 25A and 25A'. The tool holder in the present instance is shown as comprising a two-part member, namely, an upper part 28A and a lower part 29A which is bolted to the part 28A by plurality of cap screws 30A. To maintain alignment of the two parts, a slot 31A is provided in the upper part and the lower part 29A is provided with a tongue to enter this slot. The lower part 29A has a recess 34A which may receive the actual cutting tool 50, the cutting tool being retained in position by locking screw 36A. The two mounting blocks 25A and 25A' are of similar construction and are received for sliding relationship on the rods 54 and 55 as shown in detail in FIGURE 4 of the drawings. To this end the upper block 28A is bored to receive a main bearing member 58 of a cylindrical type which has at either end thereof wipers 59, 59' which may take the form of felt washers or any other material which will have a low coefficient of friction and which will serve to clean the rods 54, 55. It will be understood, of course, that the construction may be similar at each of the bores in the upper block 28A, or alternately the corresponding block 28A'. To retain the bearing and wipers in position, a portion of one end of the block 28A or 28A' is milled away as at 61 (FIG. 7) and a plate 62 is fastened in position by means of small cap screws 85 (FIG. 5), plate 62 being sufficiently large to cover the two openings for the rods 54 and 55.

Passing through both of the blocks 28A and 28A' is an adjusting screw 40A. The adjusting screw is provided with both right and left-hand threads which threadingly engage the threaded bore 63, 63' that is shown in the blocks 28A, 28A'. Broadly, it will be apparent that common rotation of the adjusting screw which threadingly engages the corresponding block 28A will move the both blocks either outwardly or inwardly as the case might be. To achieve locking of the adjustment of the screw 40A, a nut collar 64 may be provided which is threadingly received on the screw 40A and which is adapted to butt up against the end wall of the block 28A. It is often a situation in adjusting screw arrangements where play or backlash, as it is sometimes known, occurs between the screw part and its mating nut part. Inasmuch as the instant tool is a precision-type tool, namely, an external reamer, a threaded bushing has been provided at 65 which bushing may be rotated relative to the block 28A and place a force axially between the threaded nut 40A and the block 28A. The threaded bushing 65 may be locked in position by a locking set screw 66 once the play between the threaded members has been eliminated.

It will be apparent from the above description of FIGS. 4 to 7 that this assembly presents a situation where the two toolholders 25A and 25A' may move tgoether and relative to the main toolholder or base 10A. It is necessary in some instances to provide some means to limit the amount of movement of the assembly, and to this end limit screws 49A and 49A' pass through the end plates 47A, 48A to limit this movement.

Referring now to FIGURES 8 through 10 of the drawings, there is illustrated a further modified form of the invention wherein like parts have the same reference numeral with the suffix letter C. In this embodiment, there is a mounting base 10C which has projecting from one side thereof end plate supports 47C and 48C. The end plates are rigidly attached to the base numbered 10C by cap screws such as 52C. Extending between the two end plates 47C and 48C are mounting means for a pair of tools which mounting means serve the same purpose as the rods 54 and 55 provided in the previous embodiment. Specifically in this embodiment, the weighs take the form of a pair of circular rods 54C and 55C. Slidably received on the rods 54C and 55C are a pair of tool holders generally designated 25C and 25C'. The tool holder in this instance is shown as comprising a two-part member, namely, an inner part 28C nearest the base and an outer part 29C which is bolted to the part 28C by plurality of cap screws. Both blocks 28C and 29C are provided with a recess 34C which may receive the actual cutting tool 50C. The cutting tool being retained in position by locking screws 36C. The two mounting blocks 25C and 25C' are of identical construction and are received for sliding relationship on the rods 54C and 55C as shown in detail in FIGURE 10 of the drawings. To this end the inner block 28C is bored to receive a main bearing memebr 58C of a cylindrical type which has at either end thereof wipers 59C, 59C' which may take the form of belt washers or any other material which will have a low coefficient of friction and which will serve to clean the rods 54C, 55C. It will be understood, of course, that the construction may be similar at each of the bores in the both blocks 28C and 29C, or alternately the corresponding blocks 28C' and 29C'. To retain the bearing and wipers in position, plates 62C and 62C' are fastened in position by means of small cap screws 85C and 85C' (FIG. 10), plates 62C and 62C' being sufficiently large to cover the two openings for the rods 54C and 55C. These guide rods or weighs are loacted below the cutters 50C and 50C'.

Passing through both of the blocks 28C and 28C' above the cutters is an adjusting screw 40C. The adjusting screw is provided with both right and left-hand threads which threadingly engage the threaded bores 63C, 63C' that are shown in the block 28C. Broadly it will be apparent that common rotation of the adjusting screw which threadingly engages the corresponding block 28C' will move both blocks either outwardly or inwardly as the case might be. To achieve locking of the adjustment of the screw 40C, a nut collar 64C may be provided which is threadingly received on the screw 40C and which is adapted to butt up against the end wall 47C. It is often a situation in adjusting screw arrangements where play or backlash, as it is sometimes known, occurs between the screw part and its mating nut part. Inasmuch as the instant tool is a precision-type tool, namely, an external reamer, a threaded bushing has been provided at 65C which bushing may be rotated relative to the block 28C and place a force axially between the threaded nut 40C and the block 28C. The threaded bushing 65C may be locked in position by a locking set screw as seen at 66 in FIG. 6.

In operation the entire tool holder assembly is placed on a tool support of a lathe or other device in which turning is being performed in a fashion whereby in general the center of the assembly is aligned with the center of the work. Sufficient freedom of movement is permitted to the tool assembly consisting of the two blocks 25 so that accurate centering may be had with the work. The work is either advanced to the tools or the tools are advanced to the work as the case might be and upon engagement of the turning tools with the work they will center themselves on the work inasmuch as they are located diametrically opposite one to the other. Freedom in centering is readily provided by the roller support of the holders within the tool holder base 10 and the cutting tool will proceed along the work to the limit desired always maintaining itself in alignment with the work, thus preventing any chance of eccentricity being developed and a true circle being in fact turned.

I claim:

1. A toolhead comprising holder means, mountings for a pair of cutting tools at diametrically opposite sides of work to be operated upon, means for relatively adjusting said mountings means for connecting said mountings together, means having a straight line uninterrupted surface for commonly supporting said mountings for freedom of movement relative to said holder means so that cutting tools mounted in said mountings can, while both remaining in contact with the work, move together and in the same direction transversely of the axis of relative rotation of the tool head and the work to keep the tools centered with respect to the work.

2. A toolhead as in claim 1 wherein said means for relatively adjusting said mountings comprises a right and left hand threaded member engaging said mountings for opposite movement thereof.

3. A toolhead in accordance with claim 1 wherein said means for supporting said mountings comprises a rigid member common to the cutter mountings for carrying the cutting tools.

4. A toolhead in accordance with claim 1 wherein the means for commonly supporting said mountings comprises a bar that is supported by and slides relative to said holder means, bearing members being interposed between the bar and the holder means.

5. A toolhead in accordance with claim 4 wherein the bar is of T-section from which depend said mountings.

6. A toolhead in accordance with claim 1 wherein the means for commonly supporting said mountings comprises a bar that is supported by said holder means and said mountings for cutting tools slide relative to said bar.

7. A toolhead in accordance with claim 6 wherein there are two cylindrical bars.

8. A toolhead comprising mountings for a pair of cutting tools at diametrically opposite sides of work to be operated on, means for commonly interconnecting said mountings, means for adjusting said mountings relative to each other, holder means, a bar fixed in said holder means for commonly slidably supporting said mountings for freedom of movement so that cutting tools mounted in said mountings can, while both remaining in contact with the work, move together and in the same direction transversely of the axis of relative rotation of the toolhead and the work to keep the tools centered with respect to the work.

9. A toolhead in accordance with claim 8 wherein there are two cylindrical bars and said mountings are provided with openings through which said bars extend for supporting said mountings on said bars and wherein the second said means comprises a common adjusting screw.

References Cited
UNITED STATES PATENTS

| | | | |
|---|---|---|---|
| 1,366,249 | 1/1921 | Cunningham | 82—25 |
| 2,043,862 | 6/1936 | Neroman | 10—89 |
| 2,235,269 | 3/1941 | Walker | 10—89 |
| 2,477,482 | 7/1949 | Florin | 29—105 |
| 3,129,620 | 4/1964 | Muelhouser | 82—20 |

LEONIDAS VLACHOS, *Primary Examiner.*